(12) United States Patent
Kadokawa et al.

(10) Patent No.: US 11,331,626 B2
(45) Date of Patent: May 17, 2022

(54) MEMBRANE FILTRATION METHOD

(71) Applicant: METAWATER CO., LTD., Tokyo (JP)

(72) Inventors: Naruaki Kadokawa, Tokyo (JP); Yasuhiro Kato, Tokyo (JP); Tomomi Sao, Tokyo (JP)

(73) Assignee: Metawater Co., Ltd., Tokyo (JP)

( * ) Notice: Subject to any disclaimer, the term of this patent is extended or adjusted under 35 U.S.C. 154(b) by 272 days.

(21) Appl. No.: 16/568,765

(22) Filed: Sep. 12, 2019

(65) Prior Publication Data

US 2020/0001237 A1    Jan. 2, 2020

Related U.S. Application Data

(63) Continuation of application No. PCT/JP2017/034723, filed on Sep. 26, 2017.

(30) Foreign Application Priority Data

Mar. 30, 2017   (JP) .............................. JP2017-068708

(51) Int. Cl.
*B01D 61/14*     (2006.01)
*B01D 65/02*     (2006.01)
(Continued)

(52) U.S. Cl.
CPC .......... *B01D 61/145* (2013.01); *B01D 65/02* (2013.01); *C02F 1/52* (2013.01); *B01D 2311/04* (2013.01);
(Continued)

(58) Field of Classification Search
None
See application file for complete search history.

(56) References Cited

U.S. PATENT DOCUMENTS 5,647,988 A * 7/1997 Kawanishi ........... B01D 29/114
                                              210/636
2008/0314842 A1* 12/2008 Ben Yaacov ............ C02F 11/00
                                          210/748.16

FOREIGN PATENT DOCUMENTS

JP       2001-070758 A1     3/2001
JP       2006-136851 A1     6/2006
(Continued)

OTHER PUBLICATIONS

International Search Report and Written Opinion (Application No. PCT/JP2017/034723) dated Nov. 7, 2017.
(Continued)

*Primary Examiner* — David C Mellon
(74) *Attorney, Agent, or Firm* — Burr & Brown, PLLC

(57) ABSTRACT

This membrane filtration method includes: a membrane filtration process for adding a coagulant to water to be treated which contains viruses, and filtering the water to be treated by using a filtration membrane; and a cleaning process for, after the membrane filtration process, cleaning the filtration membrane, the membrane filtration process and the cleaning process being repeatedly performed, wherein, in the membrane filtration process, in the initial period of filtration, at least either an operation of filtering the water to be treated that includes the coagulant added by an amount larger than the amount of a coagulant added in a normal case, or an operation of filtering the water to be treated that has a pH lower than the pH of water to be treated in a normal case, is performed.

3 Claims, 3 Drawing Sheets

(51) Int. Cl.
  *C02F 1/52* (2006.01)
  *C02F 103/00* (2006.01)
(52) U.S. Cl.
  CPC .. *B01D 2311/18* (2013.01); *B01D 2311/2642* (2013.01); *B01D 2321/04* (2013.01); *C02F 2103/003* (2013.01)

(56) References Cited

FOREIGN PATENT DOCUMENTS

| | | |
|---|---|---|
| JP | 2008-221168 A1 | 9/2008 |
| JP | 2011-025143 A1 | 2/2011 |
| JP | 2012-210593 A1 | 11/2012 |

OTHER PUBLICATIONS

Japanese Office Action (Application No. 2017-068708) dated Apr. 27, 2021 (with English translation).

\* cited by examiner

● EXAMPLE1: PAC POURING RATE 200 mg/L DURING WATER FILLING PROCESS PLUS 5 MINUTES, AND THEN 60 mg/L
▲ COMPARATIVE EXAMPLE 1: PAC POURING RATE CONSTANTLY 60 mg/L

● EXAMPLE 2: COAGULANT 120 mg/L DURING WATER FILLING PROCESS, AND 60 mg/L DURING FILTRATION
▲ COMPARATIVE EXAMPLE 2: COAGULANT 60 mg/L DURING WATER FILLING PROCESS AND FILTRATION

■ EXAMPLE 3: ADJUST pH TO 6.5 DURING WATER FILLING PROCESS (2 MINUTES) PLUS 5 MINUTES
▲ COMPARATIVE EXAMPLE 3: (NO pH ADJUSTMENT)

■ EXAMPLE 4: ADJUST pH TO 6.5 DURING WATER FILLING PROCESS (2 MINUTES) ONLY
▲ COMPARATIVE EXAMPLE 2: (NO pH ADJUSTMENT)

MEMBRANE FILTRATION METHOD

BACKGROUND OF THE INVENTION

Field of the Invention

The present invention relates to a membrane filtration method. More specifically, it relates to a membrane filtration method which may prevent reduction in a virus removal rate in an initial period of filtration.

Description of Related Art

In recent years, wastewater reuse has been promoted, especially in water-short areas. In wastewater reuse, virus removal is demanded in view of ensuring hygienic safety of reused water, and it is included in the index of water quality.

For example, in wastewater treatment, it is important to reduce viruses contained in wastewater (water to be treated). A virus removal method to remove viruses from water to be treated, in which viruses are coagulated and then filtered (membrane filtration), for example, has been reported as a method to reduce viruses in water to be treated such as wastewater (see Patent Document 1).

CITATION LIST

Patent Documents

[Patent Document 1] JP-A-2011-025143

SUMMARY OF THE INVENTION

Problem to be Solved by the Invention

The inventors of the present invention have found as a result of experiments that, in membrane filtration, the virus removal rate is low in the initial period of filtration and gets stable (higher) as the membrane filtration continues. And they have also found that reduction in the virus removal rate occurs when a new filtering membrane is used for the first time and every time filtration is performed after backwashing and chemical cleaning.

Thus, it is necessary to discard water filtered in the initial period of filtration, while the virus removal rate is low, for ensuring safety of the water to be reused. The virus removal rate in the initial period of filtration needs to be increased (not lowered) so that the amount of treated water and its retrieval rate can be increased. Especially, as the membrane is washed at regular intervals in membrane filtration, the virus removal rate is reduced every time the membrane is washed. Thus, it is important to prevent reduction in the removal rate right after the washing of the membrane (initial period of filtration). In this respect, Patent Document 1 does not at all focus on such a problem.

Means for Solving the Problem

The present invention provides the membrane filtration method hereinafter described.

According to a first aspect of the present invention, a membrane filtration method including a membrane filtering process to filter water to be treated containing a virus with a filtering membrane by adding a coagulant to the water to be treated and a cleaning process to clean the filtering membrane after the membrane filtering process, wherein the membrane filtering process and the cleaning process are repeated in the method, and wherein at least one of procedures (1) and (2) below is performed in an initial period of filtration in the membrane filtering process:

(1) filtering the water to be treated to which the coagulant is added in an amount larger than an amount of the coagulant added in a normal time;

(2) filtering the water to be treated having a pH lower than a pH of the water to be treated in a normal time.

According to a second aspect of the present invention, the membrane filtration method according to the first aspect is provided above, wherein the initial period of filtration in the membrane filtering process is a period including at least a water filling process that is a process to fill water in the filtering membrane.

According to a third aspect of the present invention, the membrane filtration method according to the second aspect is provided above, wherein the initial period of filtration in the membrane filtering process further includes a period of 5 minutes after the water filling process.

According to a fourth aspect of the present invention, the membrane filtration method according to any one of the first to third aspects is provided above, wherein the filtering membrane is a ceramic membrane.

According to a fifth aspect of the present invention, the membrane filtration method according to any one of the first to fourth aspects is provided above, wherein the initial period of filtration in the membrane filtering process is an initial period of filtration after the cleaning process.

According to a sixth aspect of the present invention, the membrane filtration method according to the fifth aspect is provided above, wherein the cleaning process is a process to clean the filtering membrane by backwashing.

Effects of the Invention

According to the membrane filtration method of the present invention, it is possible to prevent reduction in the virus removal rate in the initial period of filtration.

DETAILED DESCRIPTION OF THE INVENTION

Hereinafter, an embodiment of the present invention is explained. The present invention is not limited to the following embodiment, and it should be understood that the following embodiment may be modified or improved on the basis of ordinary knowledge of those skilled in the art without departing from the scope of the invention.

(1) Membrane Filtration Method:

The embodiment of the membrane filtration method according to the present invention includes a membrane filtering process and a cleaning process, and filtration is performed by repetition of the membrane filtering process and the cleaning process. The membrane filtering process is a process to filter water to be treated containing viruses with a filtering membrane by adding a coagulant thereto. Specifically, it is a process to obtain filtered water, in which the water to be treated containing the coagulant (water to be treated to which a coagulant is added) is filtered with the filtering membrane and objects to be removed (including viruses) are removed from the water to be treated containing the coagulant. The cleaning process is a process to clean the filtering membrane after the membrane filtering process. According to the present invention, in the membrane filtering process, at least one of the following procedures (1) and (2) is performed in the initial period of the filtration.

(1) Filter the water to be treated to which the coagulant is added in an amount larger than the amount of the coagulant added in a normal time.

(2) Filter the water to be treated at a pH lower than the pH of the water to be treated in a normal time.

According to the membrane filtration method described above, as at least one of the procedures (1) and (2) described above is performed in the membrane filtering process, the virus removal rate in the initial period of filtration may be prevented from being reduced.

Figure 1:
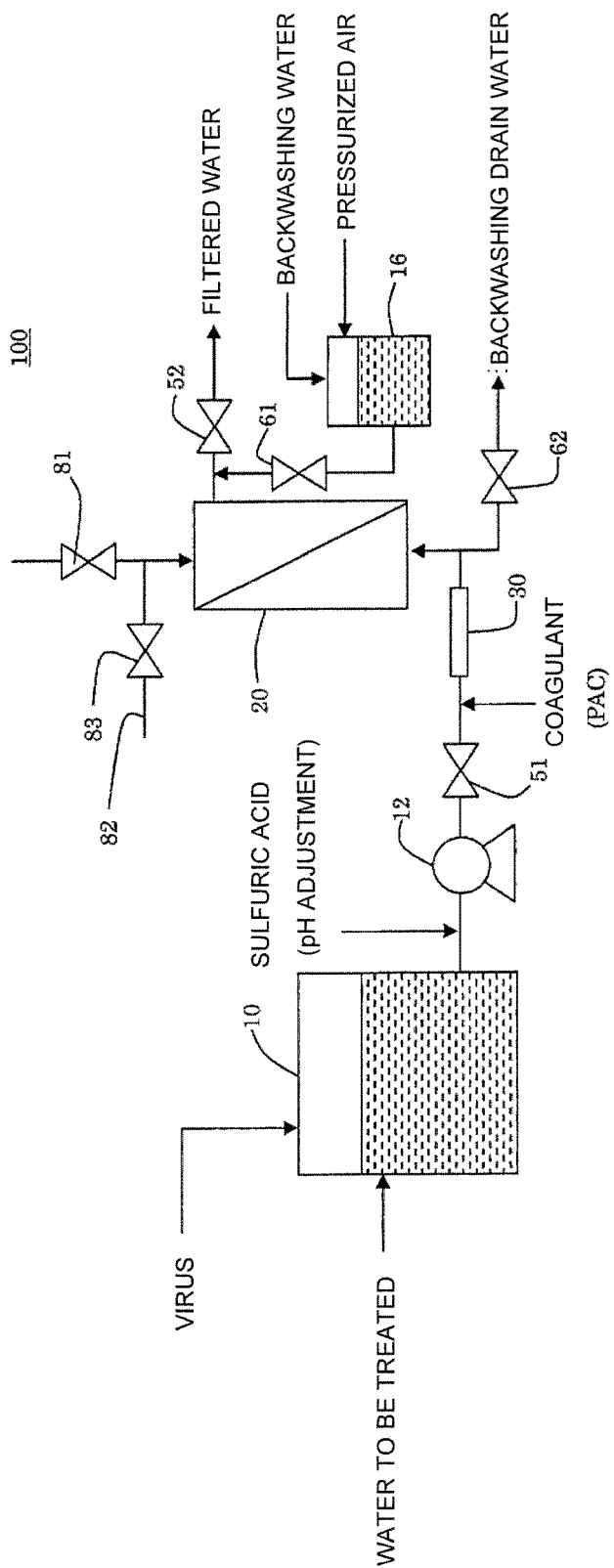
FIG. 1 is an explanatory drawing which schematically shows a membrane filtering system to perform filtration according to an embodiment of the membrane filtration method of the present invention.

The filtration according to the embodiment of the present invention may be performed using a membrane filtering system 100 shown in FIG. 1, for example. The membrane filtering system 100 shown in FIG. 1 includes a raw water tank 10 which stores therein the water to be treated containing viruses, and a membrane filtering unit 20 which obtains the filtered water by filtering, with the filtering membrane, the water to be treated provided via a water-to-be-treated pump 12 from the raw water tank 10. The membrane filtering system 100 further includes a static mixer 30 located between the water-to-be-treated pump 12 (i.e. raw water tank 10) and the membrane filtering unit 20 and mixes the water to be treated and coagulant, and a backwashing water tank 16 which stores therein backwashing water used in backflow cleaning (i.e. backwashing) of the filtering membrane of the membrane filtering unit 20. The membrane filtering unit 20 includes a ceramic filter described later and a housing which encloses the ceramic filter. The membrane filtering system 100 shown in FIG. 1 includes a line for pouring acids (for example, sulfuric acid) for adjusting the pH of the water to be treated. However, such a line for pouring acids is not necessary in a case where only the amount of the coagulant to be poured undergoes adjustment.

According to the membrane filtration method of the present invention, the coagulant may be poured between the raw water tank 10 and the membrane filtering unit 20 (filtering membrane) only, as described above. That is, in a case where a ceramic filter is used as the filtering membrane, as in the membrane filtering system 100, the virus removal rate in the initial period of filtration may be prevented from being reduced as the coagulant is poured to be mixed in a flow path between the raw water tank 10 and the membrane filtering unit 20 (filtering membrane).

(1-1) Membrane Filtering Process:

The membrane filtering process is a process to add the coagulant to the water to be treated containing viruses and filter the water with the filtering membrane, as described above.

The "water to be treated" is an object of water treatment which contains viruses in various kinds of water treatments such as tap water treatment, wastewater treatment, industrial water treatment, and drainage water treatment. In wastewater treatment and the like, the water to be treated may contain pollutants besides viruses.

The filtering membrane of the present invention is not particularly limited, and a ceramic filtering membrane may be used, for example. The ceramic filtering membrane may be, for example, alumina, titania, zirconia, silica, mullite, spinel, or a mixture thereof.

The filtering base material may be, for example, alumina, titania, zirconia, silica, mullite, spinel, or a mixture thereof.

The form of the ceramic filter is not particularly limited, and may be cylindrical, elliptic cylindrical, or such.

The ceramic filter may be installed such that the direction in which the water flow pores are extended is parallel to the vertical direction. The installation direction of the ceramic filter is not particularly limited, and the ceramic filter may be installed such that the direction in which the water flow pores are extended is diagonal or perpendicular to the vertical direction.

The coagulant is not particularly limited as long as it is capable of coagulating viruses, and a suitably selected coagulant may be used. The coagulant may be an organic coagulant or an inorganic coagulant, which may be used each alone or in combination.

The inorganic coagulant may be, for example, PAC (poly aluminium chloride), sulfate band, ferric chloride, and the like.

The membrane filtering process of the present invention includes two periods, the initial period of filtration and the main period of filtration after the initial period of filtration. Though a procedure fulfilling conditions of at least one of the procedures (1) and (2) described above is performed in the initial period of filtration as described above, a procedure under a primary condition is performed in the main period of filtration after the initial period of filtration. The "primary condition" means that the addition amount of the coagulant is to be an addition amount necessary and sufficient for the treatment of the water to be treated (specifically, the addition amount suitably determined according to a result of a jar test and the like described later), and that the pH of the water to be treated is not intentionally lowered (specifically, the pH predetermined according to a result of a jar test and the like described later), unlike in the initial period of filtration.

Here, the "initial period of filtration" means a time period of 0 to 7 minutes from the start (referential) of membrane filtration in the membrane filtering process. However, this time period may be suitably adjusted according to the condition such as the content of the upstream side of the membrane, the water amount supplied to the membrane, and the membrane filtration flux. And the "initial period of filtration" does not mean the start of the membrane filtration for the first time only. In the present invention, as the membrane filtering process and the cleaning process are repeated, the "initial period of filtration" is also present when the membrane filtration is started after the cleaning process.

In the present invention, in a case where a water filling process described later is performed, the water filling process is included in the filtering process, in this explanation. In that case, the initial period of filtration in the membrane filtering process may be a period of the water filling process only or a period during the water filling process plus a predetermined time (for example, 5 minutes) after the water filling process. The necessary time for the water filling process is usually 30 seconds to 2 minutes.

The addition amount of the coagulant in a normal time is an addition amount suitably determined as the amount of the coagulant necessary for the treatment of the water to be treated according to a result of a jar test or a membrane filtering experiment which is performed on the water to be treated, for example. In a case where the water to be treated is wastewater of secondary treatment as in a reclaimed water production equipment of Shibaura Water Reclamation Center, for example, the addition amount of the coagulant (dose) is 30 to 70 mg/L, which is set according to the water quality of raw water such as turbidity.

On the other hand, when the procedure (1) (that is, the procedure of "filtering the water to be treated to which the coagulant is added in an amount larger than the amount of the coagulant added in a normal time") is performed, the coagulant is added in the initial period of filtration in an amount larger than the addition amount in a normal time determined as described above. For example, if the addition amount of the coagulant which is added in a normal time is defined as the "referential addition amount," the coagulant may be added in one and a half to three times the referential addition amount.

In the present invention, "an amount larger than the amount of the coagulant added in a normal time" means an amount larger than the addition amount determined according to the water quality of the water to be treated. Especially in the membrane filtration after the cleaning process, it can also mean an amount larger than the addition amount of the coagulant added in the last (just finished) membrane filtration.

The "pH of the water to be treated in a normal time" means a pH predetermined according to a result of a jar test or a membrane filtering experiment which is performed on the water to be treated. In many cases, the pH of the water to be treated is 7 or more. But it is sometimes necessary to adjust the pH of the water to be treated, and the pH is adjusted to about 6.8, for example. In a case where the pH of the water to be treated is adjusted as described above, the adjusted pH (in the above-described case, pH 6.8) is defined as the "pH of the water to be treated in a normal time."

On the other hand, in the present invention, when the procedure (2) (that is, the procedure of "filtering the water to be treated at a pH lower than the pH of the water to be treated in a normal time") is performed, the pH is adjusted (that is, pH is lowered) so that the virus removal effect of the coagulant gets even better than at a pH determined according to a result of a jar test or a membrane filtering experiment. For example, in a case where aluminum coagulant (PAC, etc.) is used as the coagulant, the pH of the water to be treated, which is usually 7 or higher, is preferably adjusted to 6.8 or lower, more preferably 6.5 or lower, in the initial period of filtration, if it is determined that it is not necessary to adjust the pH as a result of a jar test and the like. On the other hand, if it is determined that it is necessary to adjust the pH, the pH is preferably adjusted to 6.5 or lower in the initial period of filtration, as the pH in a normal time is adjusted to about 6.8.

In other words, the phrase "the pH is lower than the pH of the water to be treated in a normal time" in the present invention means it is lower than the pH determined according to the water quality of the water to be treated. Especially in the membrane filtration after the cleaning process, it can also mean that the pH is to be lower than the pH of the water to be treated which has been treated in the last (just finished) membrane filtration.

In a case where a procedure of adjusting the pH of the water to be treated is employed, there may further be installed a pH adjusting section (not shown in the drawings) in the fore stage of the pouring point of the coagulant in the membrane filtering system 100. FIG. 1 shows that the pH is adjusted by addition of sulfuric acid.

As described above, performing the procedure fulfilling either of the condition of the procedures (1) and (2) in the initial period of filtration may increase the amount of virus to be removed in the coagulation and membrane filtration, maintaining the virus removal rate high even in the initial period of filtration. In following the above approach, it is not necessary to discard the filtered water in the initial period of filtration, and even if filtered water is to be discarded, the amount of the water to be discarded may be reduced.

According to the present invention, a procedure fulfilling conditions of both of the procedures (1) and (2) described above may be performed. In that case, it is possible to prevent reduction in the virus removal rate in the initial period of filtration very effectively.

Whether to employ either or both of the procedures (1) and (2) described above is to be suitably determined according to the quality of the water to be treated or the equipment situation.

(1-2) Cleaning Process:

The cleaning process is a process to clean the filtering membrane after the membrane filtering process. A procedure similar to the conventionally known procedure may be suitably applied in this cleaning process. Backwashing and chemical cleaning may be a method to clean the filtering membrane.

The cleaning process may be performed as follows, specifically (a method to clean the filtering membrane by backwashing is described in the following explanation). First, as shown in FIG. 1, the water-to-be-treated pump 12 is stopped with the water-to-be-treated valve 51 and the filtered water valve 52 being closed, and pressurized air is sent to the backwashing water tank 16 with the backwashing valve 61 being open, so that the filtering membrane is maintained in a pressurized state (pressure process). Next, the backwashing drain valve 62 is opened and the filtering membrane is backwashed as the backwashing water is drained via the backwashing drain valve 62 (backwashing process). The backwashing water (backwashing drain water) containing causative substances of fouling such as flocs adhering to the surface of the filtering membrane, which is drained in the backwashing process, is sent to the drain water treatment equipment via the backwashing drain water valve 62 and treated there.

After the backwashing process, the inside of the water flow pores may further be cleaned with the pressurized air for airblow, as the pressurized air for airblow is flown to the water flow pores of the ceramic filter in the membrane filtering unit 20 with the backwashing valve 61 being closed and with the pressurized-air-for-airblow valve 81 being open (blow process). The blow process is included in the cleaning process in the present description.

(1-3) Water Filling Process:

In a case where the blow process is performed after the backwashing process, the water filling process is performed as follows. The water filling process is a process to fill water in the filtering membrane, and in the following explanation, it is a process to fill water in the upstream side area of the ceramic filter. In a case where the blow process is not performed, the water filling process is unnecessary. The water filling process is described as a process included in the membrane filtering process in the present invention, as described above.

In a case where the cleaning process has already been performed as described above, the water filling process is performed after the end of the blow process described above by: closing the backwashing drain water valve 62 and the pressurized-air-for-airblow valve 81 (the filtered water valve 52 is kept closed); operating the water-to-be-treated pump 12 with the water-to-be-treated valve 51 and the water filling valve 83 being open; draining air in the upstream side area via the water filling line 82; and filling the water to be treated in the upstream side area of the ceramic filter. After the water filling process is performed, the filtration of the water to be treated can be actually restarted.

In the present invention, as described above, in the initial period of filtration including the water filling process, the procedure fulfilling the conditions of at least one of the procedures (1) and (2) described above is preferably performed. Specifically, in the process where the upstream side area of the ceramic filter is filled with the water to be treated, the procedure fulfilling the conditions of at least one of the procedures (1) and (2) described above is performed. At the time of restart of the filtration of the water to be treated, the procedure fulfilling the conditions of at least one of the procedures (1) and (2) described above is continuously performed as necessary.

EXAMPLES

Hereinafter, the present invention is explained specifically on the basis of Examples. However, the present invention is not limited to these Examples.

Example 1

The filtration according to the membrane filtration method of the present invention was performed with the membrane filtering system 100 shown in FIG. 1. Specifically, the coagulant (PAC) dose added in a normal time (that is, in the main period of filtration) in the membrane filtering process was 60 mg/L, the coagulant (PAC) dose in the initial period of filtration in the membrane filtering process was 120 mg/L. The time period of the water filling process (2 minutes) plus five minutes after that was defined as the "initial period of filtration." The water to be treated had a pH of 7.6 to 7.7.

Figure 2:
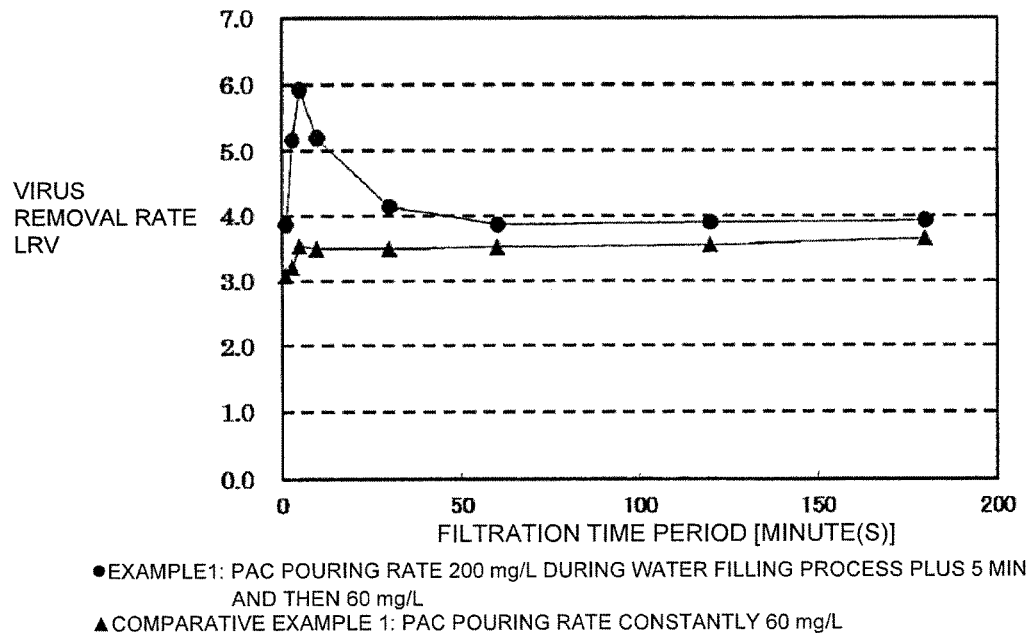
FIG. 2 is a graph showing results of Example 1 and Comparative Example 1.

In such a condition, the virus removal rate from the start of the membrane filtering process was calculated. The result is shown in Table 1 and FIG. 2.

The virus used in the Examples was coli phage MS2. In the experiment, coli phage MS2 at high concentration was added to the raw water tank 10 so that the virus concentration in the water to be treated was about 1,000,000 PFU/mL. The plaque formation method was employed in quantitative determination of the virus. FIG. 1 shows that the virus was added to the raw water tank 10 for the experiment, and the virus is not added in a usual water treatment. The ceramic filtering membrane (ceramic filter) had a nominal pore size of 0.1 m and a membrane area of 0.42 m². The filtration was performed in a dead-end type at the constant flow rate (membrane permeation flux) of 4.0 m/d.

It was confirmed in this Example that increase of the PAC dose results in improvement of the virus removal property in the initial period of filtration.

Comparative Example 1

The virus removal rate was calculated in a method similar to the Example 1 except that the coagulant (PAC) dose in the membrane filtering process was constantly 60 mg/L (the dose was equal in the initial period of filtration and the main period of filtration). The result is shown in Table 1 and FIG. 2.

TABLE 1

| | Virus Removal Rate LRV | |
|---|---|---|
| Filtration Time (minute(s)) | Example 1 | Comparative Example 1 |
| 1 | 3.9 | 3.1 |
| 3 | 5.2 | 3.2 |
| 5 | 5.9 | 3.5 |
| 10 | 5.2 | 3.5 |
| 30 | 4.1 | 3.5 |
| 60 | 3.9 | 3.5 |
| 120 | 3.9 | 3.5 |
| 180 | 3.9 | 3.6 |

Example 2

Figure 3:
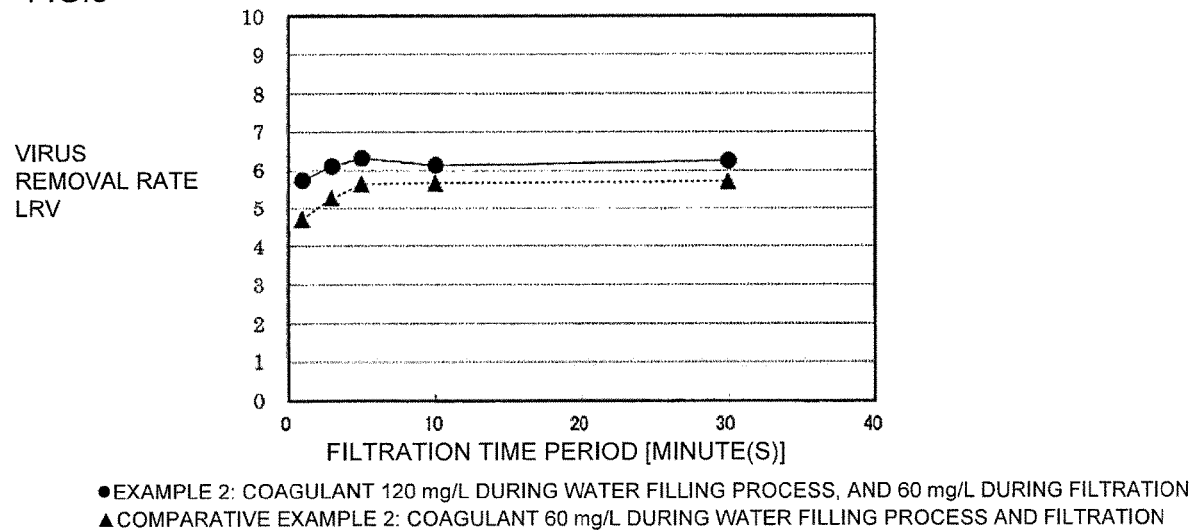
FIG. 3 is a graph showing results of Example 2 and Comparative Example 2.

The virus removal rate was calculated in a method similar to the Example 1 except that the "initial period of filtration" in the membrane filtering process was the water filling process (two minutes) only. The result is shown in Table 2 and FIG. 3.

It was also confirmed in this Example that increase of the PAC dose results in improvement of the virus removal property in the initial period of filtration.

Comparative Example 2

The virus removal rate was calculated in a method similar to the Example 2 except that the coagulant (PAC) dose in the membrane filtering process was constantly 60 mg/L (the dose was equal in the initial period of filtration and the main period of filtration). The result is shown in Table 2 and FIG. 3.

TABLE 2

| | Virus Removal Rate LRV | |
|---|---|---|
| Filtration Time (minute(s)) | Example 2 | Comparative Example 2 |
| 1 | 5.7 | 4.7 |
| 3 | 6.1 | 5.3 |
| 5 | 6.3 | 5.6 |
| 10 | 6.1 | 5.7 |
| 30 | 6.2 | 5.7 |

Example 3

Sulfuric acid was added to the water to be treated so that the water to be treated in the initial period of filtration in the membrane filtering process had a pH of 6.5, while the coagulant (PAC) dose was 60 mg/L, in the membrane filtration. The water to be treated had a pH of 7.5 before lowering the pH to 6.5 (before sulfuric acid is poured). The time period of the water filling process (two minutes) plus 5 minutes after that was defined as the "initial period of filtration." After the initial period of filtration, the addition of sulfuric acid is stopped and only the coagulant is poured (the dose was constantly 60 mg/L). The pH of the water to be treated got higher after the initial period of filtration. The pH was 7.1 after 10 minutes from the start of the filtration, and 7.2 after 60 minutes.

Figure 4:
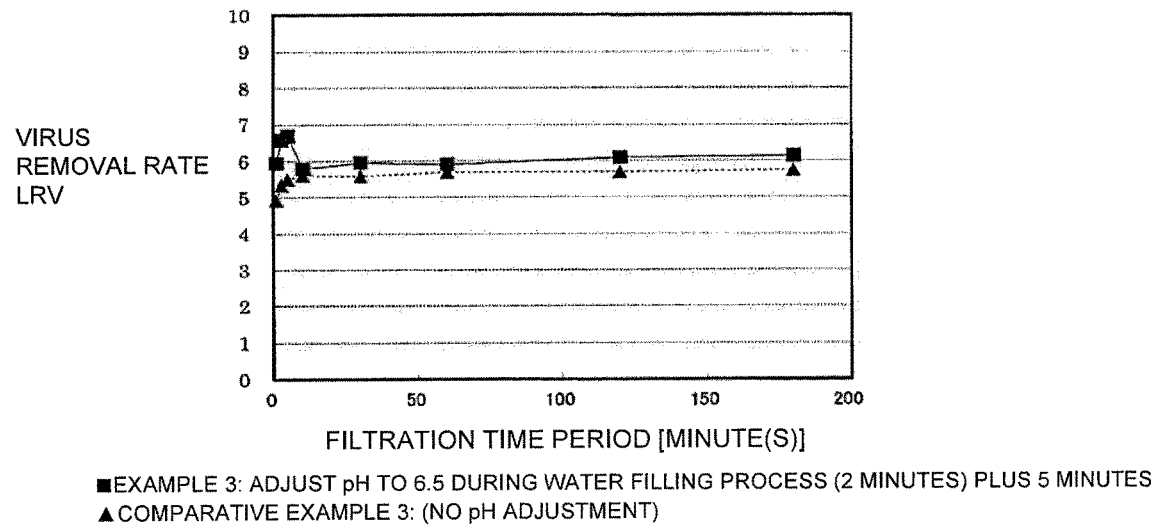
FIG. 4 is a graph showing results of Example 3 and Comparative Example 3.

In such a condition, the virus removal rate from the start of the membrane filtering process was calculated. The result is shown in Table 3 and FIG. 4.

It was confirmed in Example 3 that adjustment of pH (lowering pH) of the water to be treated results in improvement of the virus removal property in the initial period of filtration.

Comparative Example 3

The virus removal rate was calculated in a method similar to Example 1 except that the coagulant (PAC) dose in the membrane filtering process was constantly 60 mg/L (the dose was equal in the initial period of filtration and the main period of filtration). The result is shown in Table 3 and FIG. 4. The pH of the water to be treated was not adjusted in Example 1, and nor in this Comparative Example.

TABLE 3

| Filtration Time (minute(s)) | Virus Removal Rate LRV | |
|---|---|---|
| | Example 3 | Comparative Example 3 |
| 1 | 5.9 | 4.9 |
| 3 | 6.6 | 5.3 |
| 5 | 6.7 | 5.5 |
| 10 | 5.8 | 5.6 |
| 30 | 6.0 | 5.6 |
| 60 | 5.9 | 5.7 |
| 120 | 6.1 | 5.7 |
| 180 | 6.1 | 5.7 |

Example 4

Figure 5:
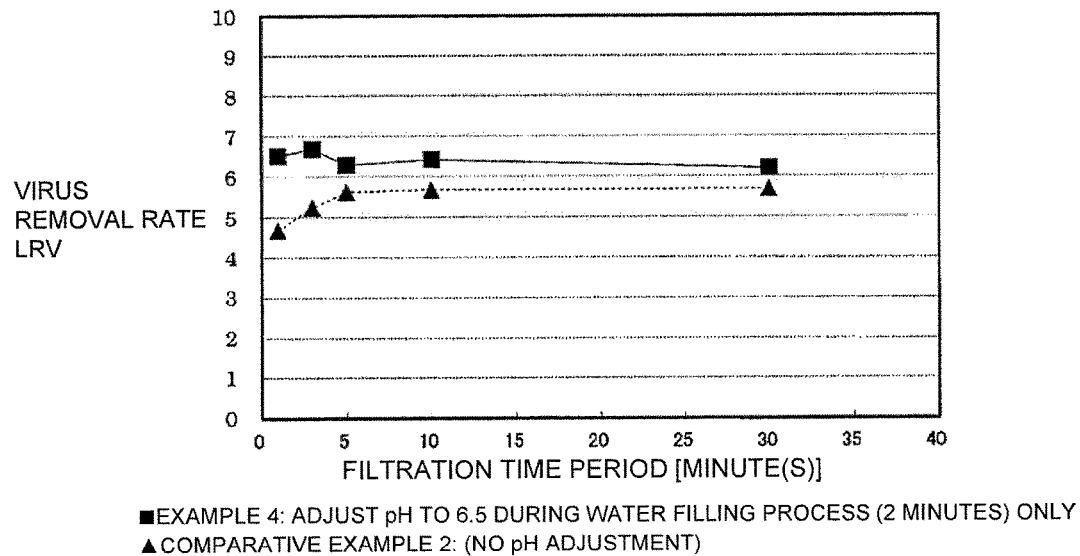
FIG. 5 is a graph showing results of Example 4 and Comparative Example 2.

The virus removal rate was calculated in a method similar to Example 3 except that the "initial period of filtration" in the membrane filtering process was only the water filling process (2 minutes). The result is shown in Table 4 and FIG. 5. FIG. 5 shows, in addition to the result of Example 4, the result of Comparative Example 2 as a reference.

TABLE 4

| Filtration Time (minute(s)) | Virus Removal Rate LRV | |
|---|---|---|
| | Example 4 | Comparative Example 2 |
| 1 | 6.5 | 4.7 |
| 3 | 6.7 | 5.3 |
| 5 | 6.3 | 5.6 |
| 10 | 6.4 | 5.7 |
| 30 | 6.2 | 5.7 |

From the results described above, it has been found that the membrane filtration method of the present invention may prevent reduction in the virus removal rate in the initial period of filtration.

INDUSTRIAL APPLICABILITY

The membrane filtration method of the present invention may be employed as a method enabling virus removal from water to be treated such as treated wastewater containing viruses while maintaining the removal rate.

DESCRIPTION OF REFERENCE NUMERALS

10: raw water tank, 12: water-to-be-treated pump, 16: backwashing water tank, 20: membrane filtering unit, 30: static mixer, 51: water-to-be-treated valve, 52: filtered water valve, 61: backwashing valve, 62: backwashing drain water valve, 81: pressurized-air-for-airblow valve, 82: water filling line, 83: water filling valve, 100: membrane filtering system.

The invention claimed is:

1. A membrane filtration method comprising a membrane filtering process to filter waste water to be treated containing a virus with a ceramic filtering membrane by adding a coagulant that is capable of coagulating viruses to the waste water to be treated and a cleaning process to clean the ceramic filtering membrane after the membrane filtering process,
    wherein the membrane filtering process and the cleaning process are repeated in the method,
    wherein a washing water is drained from the ceramic filtering membrane by cleaning of the cleaning process,
    wherein prior to the membrane filtering process, at least one of procedures (1) and (2) is performed in a water filling process that is a process to fill water in the ceramic filtering membrane:
    procedure (1) filtering the waste water to be treated to which the coagulant is added in an amount larger than an amount of the coagulant added in a normal time;
    procedure (2) filtering the waste water to be treated having a pH lower than a pH of the waste water to be treated in a normal time,
    wherein the normal time is one selected from the group consisting of the following (a), (b), (c) and (d):
    (a) a main period of filtration,
    (b) a case/a period for adding the amount of the coagulant determined according to the water quality of the waste water to be treated,
    (c) a case/a period for maintaining the pH of the waste water to be treated, determined according to the water quality of the waste water to be treated,
    (d) a case/a period for maintaining (i) the amount of the coagulant or (ii) the pH of the waste water to be treated to be the same as the waste water treated in the preceding membrane filtering process.

2. The membrane filtration method according to claim 1, wherein in the membrane filtering process, at least one of the procedures (1) and (2) is performed in a period of 5 minutes from the start of the membrane filtering process after the water filling process.

3. The membrane filtration method according to claim 1, wherein the water filling process is performed after a process to clean the ceramic filtering membrane by backwashing.

* * * * *